United States Patent
Cao et al.

(10) Patent No.: US 8,638,234 B2
(45) Date of Patent: Jan. 28, 2014

(54) DESKTOP COMPUTER EMPLOYING NETWORK INDICATOR LIGHTS

(75) Inventors: Xiang Cao, Shenzhen (CN); Hai-Qing Zhou, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 402 days.

(21) Appl. No.: 13/169,036

(22) Filed: Jun. 27, 2011

(65) Prior Publication Data

US 2012/0242497 A1 Sep. 27, 2012

(30) Foreign Application Priority Data

Mar. 25, 2011 (CN) .......................... 2011 1 0073813

(51) Int. Cl.
*G08B 5/22* (2006.01)
*G09F 9/33* (2006.01)

(52) U.S. Cl.
USPC .................................................... 340/815.45

(58) Field of Classification Search
USPC .................................................... 340/815.45
See application file for complete search history.

(56) References Cited

U.S. PATENT DOCUMENTS

| | | | | |
|---|---|---|---|---|
| 5,790,041 A | * | 8/1998 | Lee | 340/815.45 |
| 6,108,199 A | * | 8/2000 | Bonardi et al. | 361/679.37 |
| 7,019,658 B1 | * | 3/2006 | Erickson et al. | 340/635 |
| 7,656,306 B2 | * | 2/2010 | Zhang | 340/815.45 |
| 8,155,012 B2 | * | 4/2012 | Austermann et al. | 370/241 |
| 2002/0122389 A1 | * | 9/2002 | Kobayashi | 370/250 |
| 2010/0121986 A1 | * | 5/2010 | Blanton et al. | 709/250 |
| 2011/0012751 A1 | * | 1/2011 | Jones | 340/825.69 |
| 2012/0242497 A1 | * | 9/2012 | Cao et al. | 340/815.45 |
| 2013/0147632 A1 | * | 6/2013 | Tu et al. | 340/815.45 |

FOREIGN PATENT DOCUMENTS

| | | | |
|---|---|---|---|
| CN | 201188217 Y | * | 1/2009 |
| CN | 201698406 U | * | 1/2011 |

* cited by examiner

*Primary Examiner* — Daniel Wu
*Assistant Examiner* — Kam Ma
(74) *Attorney, Agent, or Firm* — Altis Law Group, Inc.

(57) ABSTRACT

A desktop computer includes a host portion, a network interface card and a first interface. The network interface card includes a first pin, a second pin, and a third pin. The first interface includes a fourth pin connected to both the second and third pins of the network interface card, and a fifth pin connected to the first pin. The screen includes a second interface connected to the first interface, a first LED, and a second LED. The second interface includes a sixth pin connected to the fourth pin, and a seventh pin connected to the fifth pin. The seventh pin is connected to a power supply through the first LED. The sixth pin is connected to the power supply through the second LED. When there is communication through a network connection, the first LED and the fourth LED to flash synchronously.

20 Claims, 2 Drawing Sheets

DESKTOP COMPUTER EMPLOYING NETWORK INDICATOR LIGHTS

BACKGROUND

1. Technical Field

The disclosure relates to a desktop computer employing network indicator lights.

2. Description of Related Art

A desktop computer typically includes a screen and a host portion connected to the screen. Network indicator lights are typically located on a back surface of the host portion, where a local area network (LAN) interface of a network interface card (NIC) is positioned. Generally speaking, the host portion and the screen are apart from each other, and the host portion is typically located under a desk, thereby, a user must bend down to see whether the network indicator lights are flashing in determining whether the LAN interface is working or not, which is not the optimum in convenience.

Therefore, it is desired to provide a desktop computer to overcome the above-described problem.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the disclosure will now be described in detail below, with reference to the drawings.

Figure 1:
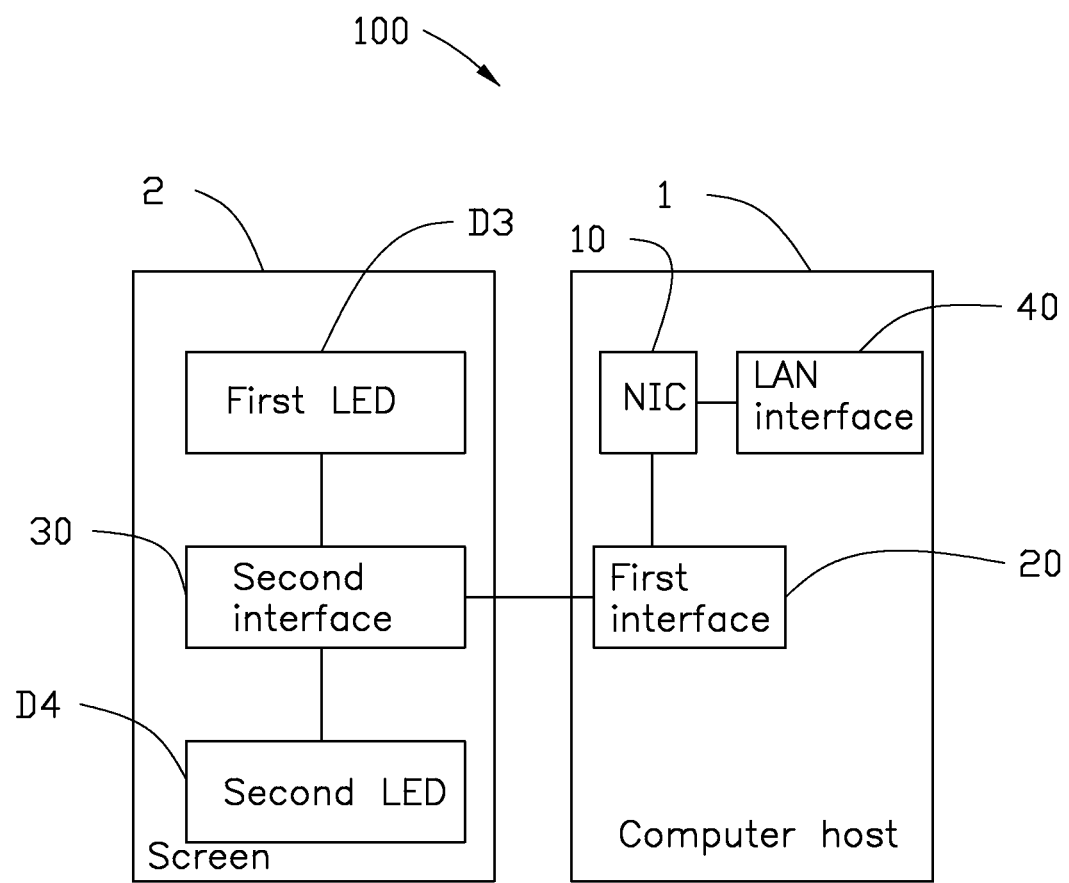
FIG. 1 is a functional block diagram of a desktop computer, according to an exemplary embodiment.
Figure 2:
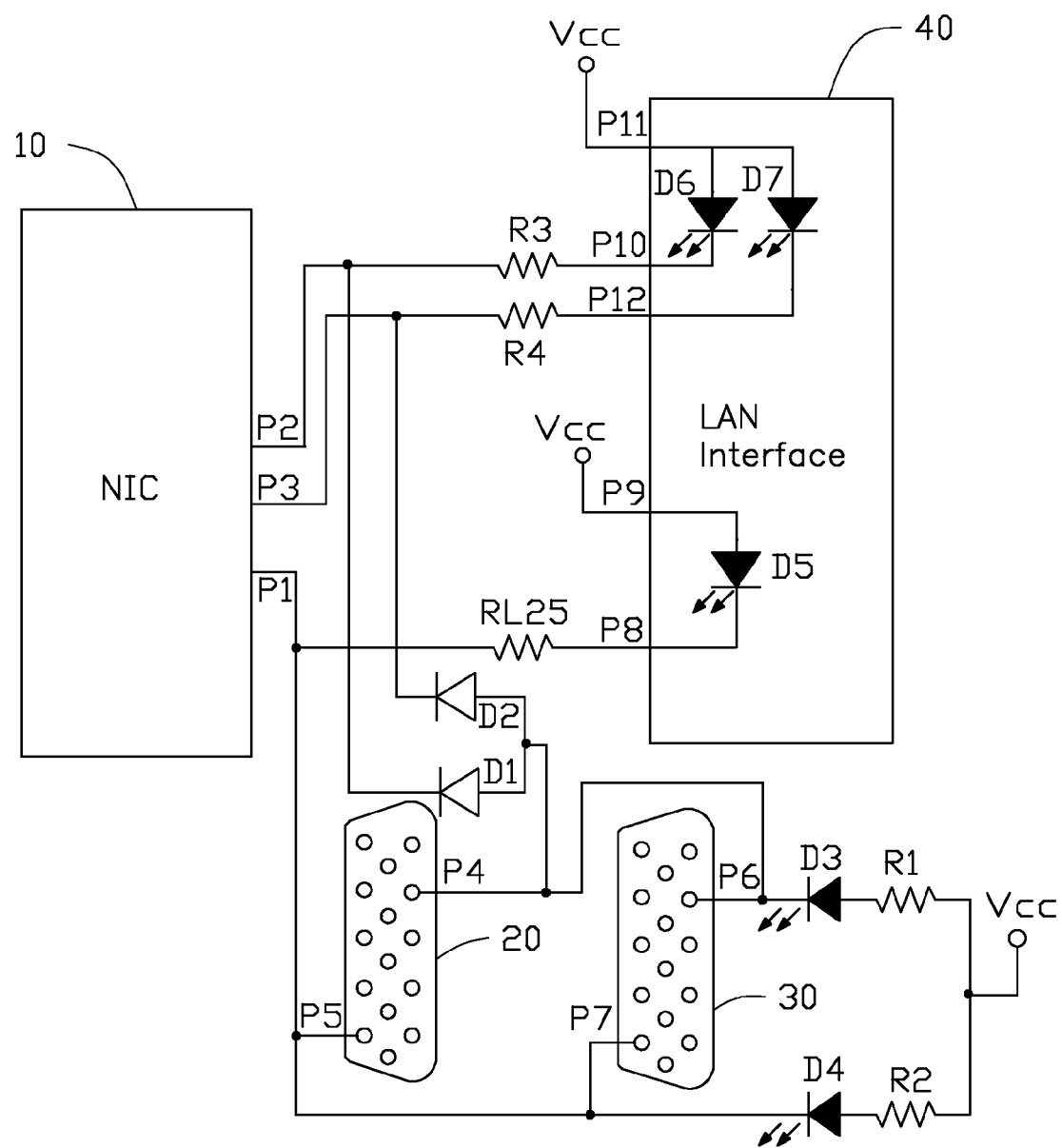
FIG. 2 is a schematic view of one embodiment of the desktop computer of FIG. 1.

Referring to FIGS. 1-2, a desktop computer 100, according to an exemplary embodiment, includes a host portion 1 and a screen 2 connected to the host portion 1. The host portion 1 includes a network interface card (NIC) 10 and a first interface 20. The screen 2 includes a second interface 30 connected to the first interface 20, a first light-emitting diode (LED) D3, and a second LED D4. In the embodiment, the host portion 1 also includes a local area network (LAN) interface 40.

The NIC 10 at least includes three pins: a first pin P1 for informing a user whether a network is active, and whether or not there is data being passed through the NIC 10, a second pin P2 for denoting a low-speed network signal transmission rate (e.g. less than 100 Mbit/s network signal) of the NIC 10, and a third pin P3 for denoting a high-speed network signal transmission rate (e.g. greater than 100 Mbit/s of the NIC 10.

In the embodiment, the first interface 20 is a video graphics array (VGA) female connector and at least includes two pins: a fourth pin P4 and a fifth pin P5. The fourth pin P4 is electrically connected to the second pin P2 of the NIC 10 through a first diode D1 and also electrically connected to the third pin P3 of the NIC 10 through a second diode D2. In particular, an anode of the first diode D1 is electrically connected to the fourth pin P4, and a cathode of the first diode D1 is electrically connected to the second pin P2. An anode of the second diode D2 is electrically connected to the fourth pin P4, and a cathode of the second diode D2 is electrically connected to the third pin P3. The fifth pin P5 is electrically connected to the first pin P1 of the NIC 10.

In the embodiment, the second interface 30 is a VGA male connector and at least includes two pins: a sixth pin P6 and a seventh pin P7. The seventh pin P7 is electrically connected to a power supply Vcc through a first light-emitting diode (LED) D3 and a resistor R1; the sixth pin P6 is also electrically connected to the power supply Vcc through a second LED D4 and a resistor R2. In particular, an anode of the first LED D3 is electrically connected to one end of the resistor R1, a cathode of the first LED D3 is electrically connected to the sixth pin P6 second interface 30, and the other end of the resistor R1 is electrically connected to the power supply Vcc. An anode of the second LED D4 is electrically connected to one end of the resistor R2, a cathode of the second LED D4 is electrically connected to the seventh pin P7 of the second interface 30, and the other end of the resistor R2 is electrically connected to the power supply Vcc. In the embodiment, both the first LED D3 and the second LED D4 are positioned on a side surface of the screen 2.

In the embodiment, the LAN interface 40 is an RJ-45 female connector and at least includes an eighth pin P8, a ninth pin P9, a tenth pin P10, an eleventh pin P11, and a twelfth pin P12. The eighth pin P8 is electrically connected to the first pin P1 of the NIC 10 through a resistor RL25. The ninth pin P9 is connected to the power supply Vcc and is also electrically to the eighth pin P8 through a third LED D5. In particular, an anode of the third LED D5 is electrically connected to the ninth pin P9 of the LAN interface 40, and a cathode of the third LED D5 is electrically connected to the eighth pin P8. The tenth pin P10 is electrically connected to the second pin P2 of the NIC 10 through a resistor R3. The eleventh pin P11 is electrically connected to the power supply Vcc and is also electrically connected to the tenth pin P10 of the LAN interface 40 through a fourth LED D6. In particular, an anode of the fourth LED D6 is electrically connected to the eleventh pin P11 and a cathode of the fourth LED D6 is electrically connected to the tenth pin P10. The twelfth pin P12 is electrically connected to the third pin P3 of the NIC 10 and is also electrically connected to the eleventh pin P11 of the LAN interface 40 through a fifth LED D7. In particular, an anode of the fifth LED D7 is electrically connected to the eleventh pin P11 and a cathode of the fifth LED D7 is electrically connected to the twelfth pin P12. In the embodiment, the third LED D5 is a network indicator light, the fourth LED D6 is a low-speed data indicator light, and the fifth LED d7 is a high-speed data indicator light.

In use, the first interface 20 is electrically connected to the second interface 30. The fourth pin P4 of the first interface 20 is electrically connected to the sixth pin P6 of the second interface 30; the fifth pin P5 of the first interface 20 is electrically connected to the seventh pin P7 of the second interface 30.

In the embodiment, a high logic signal "1" (high level voltage) is 5V, and a low logic signal "0" (low level voltage) is 0V. When a network signal is received, the first pin P1 of the NIC 10 gains a low level voltage, and accordingly both the fifth pin P5 of the first interface 20 and the seventh pin P7 of the second interface 30 gain a low level voltage. At the same time, both the second LED D4 and the third LED D5 turn on, denoting that a network signal has been received by the host portion 1. Otherwise, when both the second LED D4 and the third LED D5 are turned off, a lack of a network signal is denoted.

When there is communication through a network connection of the host portion 1, if the communication rate is low-speed network signal, the second pin P2 of the NIC 10 emits on/off pulses. When the second pin P2 of the NIC 10 outputs a low level voltage, the first LED D3 turns on to emit light, and the fourth LED D6 also turns on to emit light. When the second pin P2 of the NIC 10 outputs a high level voltage, the first LED D3 turns off, and the fourth LED D6 also turns off. Therefore, the on/off pulses emitted by the second pin P2 of the NIC 10 cause the first LED D3 and the fourth LED D6 to flash synchronously, showing that the connection between the network and the host portion 1 is low-speed network connection.

When the network connection is high-speed, the third pin P3 of the NIC 10 emits on/off pulses. When the third pin P3 of the NIC 10 outputs a low level voltage, the first LED D3 turns on to emit light, and the fifth LED D7 also turns on to emit light. When the third pin P3 of the NIC 10 outputs a high level voltage, the first LED D3 turns off, and the fifth LED D7 also turns off. Therefore, the on/off pulses emitted by the third pin P3 of the NIC 10 cause the first LED D3 and the fifth LED D7 to flash synchronously to indicate a high-speed network connection.

While certain embodiments have been described and exemplified above, various other embodiments will be apparent from the foregoing disclosure to those skilled in the art. The disclosure is not limited to the particular embodiments described and exemplified, and the embodiments are capable of considerable variation and modification without departure from the scope of the appended claims.

What is claimed is:

1. A desktop computer comprising:
   a host portion comprising a network interface card and a first interface, the network interface card comprising a first pin for informing whether a network is active and whether or not there is data being passed through the network interface card, a second pin for denoting a low-speed network signal transmission rate of the network interface card, and a third pin for denoting high-speed network signal transmission rate of the network interface card, the first interface comprising a fourth pin connected to both the second and third pins of the network interface card, a fifth pin connected to the first pin of the network interface card;
   a screen connected to the host portion, the screen comprising a second interface connected to the first interface, a first light-emitting diode, and a second light-emitting diode, the second interface comprising a sixth pin connected to the fourth pin of the first interface, and a seventh pin connected to the fifth pin of the first interface, the seventh pin connected to a power supply through the first light-emitting diode, the sixth pin connected to the power supply through the second light-emitting diode; and
   a local area network interface, wherein the local area network interface at least comprises an eighth pin, a ninth pin, a tenth pin, an eleventh pin, and a twelfth, the eighth pin is electrically connected to the first pin of the network interface card, the ninth pin is connected to the power supply and is also electrically to the eighth pin through a third light-emitting diode, the tenth pin is electrically connected to the second pin of the network interface card, the eleventh pin is electrically connected to the power supply and is also electrically connected to the ten pin of the local area network interface through a fourth light-emitting diode, the twelfth pin is electrically connected to the three pin of the network interface card and is also electrically connected to the eleventh pin of the local area network interface through a fifth light-emitting diode.

2. The desktop computer of claim 1, wherein when a network signal is received, the first pin of the network interface card gains a low level voltage, and accordingly both the fifth pin of the first interface and the seventh pin of the second interface gain a low level voltage, at the same time, both the second light-emitting diode and the third light-emitting diode turn on, denoting that a network signal has been received by the host portion, otherwise, the lack of a network signal is denoted.

3. The desktop computer of claim 1, wherein when there is communication through a network connection, if the communication rate is low-speed the second pin of the network interface card emits on/off pulses, when the second pin of the network interface card outputs a low level voltage, the first light-emitting diode turns on to emit light, and the fourth light-emitting diode also turns on to emit light.

4. The desktop computer of claim 3, wherein when the second pin of the network interface card outputs a high level voltage, the first light-emitting diode turns off, and the fourth light-emitting diode also turns off, the on/off pulses emitted by the second pin of the network interface card cause the first light-emitting diode and the fourth to flash light-emitting diode synchronously, showing that the connection between the network and the host portion is low-speed.

5. The desktop computer of claim 3, wherein when the network connection is high-speed, the third pin of the network interface card emits on/off pulses, when the third pin of the network interface card outputs a low level voltage, the first light-emitting diode turns on to emit light, and the fifth light-emitting diode also turns on to emit light.

6. The desktop computer of claim 5, wherein when the third pin of the network interface card outputs a high level voltage, the first light-emitting diode turns off, and the fifth light-emitting diode also turns off, the on/off pulses emitted by the third pin of the network interface card cause the first light-emitting diode and the fifth light-emitting diode to flash synchronously to indicate a high-speed network connection.

7. The desktop computer of claim 1, wherein the eighth pin of the local area network interface is electrically connected to the first pin of the network interface card through a resistor.

8. The desktop computer of claim 1, wherein an anode of the third light-emitting diode is electrically connected to the ninth pin of the local area network interface, a cathode of the third light-emitting diode is electrically connected to the eighth pin the local area network interface.

9. The desktop computer of claim 1, wherein the tenth pin of the local area network is electrically connected to the second pin of the network interface card through a resistor.

10. The desktop computer of claim 1, wherein an anode of the fourth light-emitting diode is electrically connected to the eleventh pin of the local area network interface and a cathode of the fourth light-emitting diode is electrically connected to the ten pin of the local area network interface.

11. The desktop computer of claim 1, wherein an anode of the fifth light-emitting diode is electrically connected to the eleventh pin of the local area network interface and a cathode of the fifth light-emitting diode is electrically connected to the twelfth pin of the local area network interface.

12. The desktop computer of claim 1, wherein the fourth pin of the first interface is electrically connected to the second pin of the network interface card through a first diode and also electrically connected to the third pin of the network interface card through a second diode.

13. The desktop computer of claim 1, wherein an anode of the first diode is electrically connected to the fourth pin of the first interface and a cathode of the first diode is electrically connected to the second pin of the network interface card; an anode of the second diode is electrically connected to the fourth pin of the first interface and a cathode of the second diode is electrically connected to the third pin of the network interface card.

14. The desktop computer of claim 1, wherein an anode of the first light-emitting diode is electrically connected to an end of a first resistor, a cathode of the first light-emitting diode is electrically connected to the sixth pin of the second interface, and the other end of the first resistor is electrically connected to the power supply; an anode of the second light-emitting diode is electrically connected to an end of the second resistor, a cathode of the second light-emitting diode is electrically connected to the seventh pin of the second interface, and the other end of the second resistor is electrically connected to the power supply.

15. The desktop computer of claim 1, wherein both the first light-emitting diode and the second light-emitting diode are positioned on a side surface of the screen.

16. The desktop computer of claim 1, wherein the low-speed network signal transmission rate is less than 100 Mbit/s and the high-speed network signal transmission rate is greater than 100 Mbit/s.

17. A desktop computer comprising:
a host portion comprising a network interface card and a first interface, the network interface card comprising a first pin for informing whether a network is active and whether or not there is data being passed through the network interface card, a second pin for denoting a low-speed network signal transmission rate of the network interface card, and a third pin for denoting high-speed network signal transmission rate of the network interface card, the first interface comprising a fourth pin connected to both the second and third pins of the network interface card, a fifth pin connected to the first pin of the network interface card; and
a screen connected to the host portion, the screen comprising a second interface connected to the first interface, a first light-emitting diode, and a second light-emitting diode, the second interface comprising a sixth pin connected to the fourth pin of the first interface, and a seventh pin connected to the fifth pin of the first interface, the seventh pin connected to a power supply through the first light-emitting diode, the sixth pin connected to the power supply through the second light-emitting diode; and
wherein an anode of the first light-emitting diode is electrically connected to the power supply, a cathode of the first light-emitting diode is electrically connected to the sixth pin of the second interface; an anode of the second light-emitting diode is electrically connected to the power supply, a cathode of the second light-emitting diode is electrically connected to the seventh pin of the second interface.

18. The desktop computer of claim 17, wherein the anode of the first light-emitting diode is electrically connected to an end of a first resistor, and the other end of the first resistor is electrically connected to the power supply; the anode of the second light-emitting diode is electrically connected to an end of the second resistor, and the other end of the second resistor is electrically connected to the power supply.

19. The desktop computer of claim 17, wherein both the first light-emitting diode and the second light-emitting diode are positioned on a side surface of the screen.

20. The desktop computer of claim 17, wherein the low-speed network signal transmission rate is less than 100 Mbit/s and the high-speed network signal transmission rate is greater than 100 Mbit/s.

* * * * *